Jan. 7, 1969          D. M. DUNKLEE          3,419,942
SWIVELING CLAMP FOR HOSES AND THE LIKE
Filed June 30, 1967
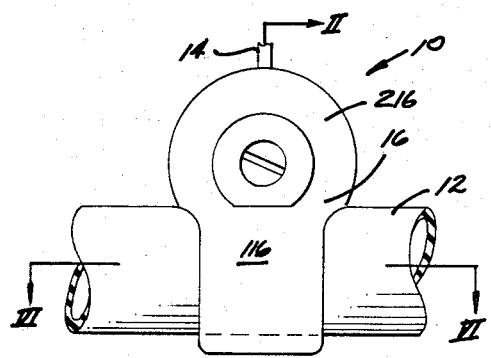
FIG. 1
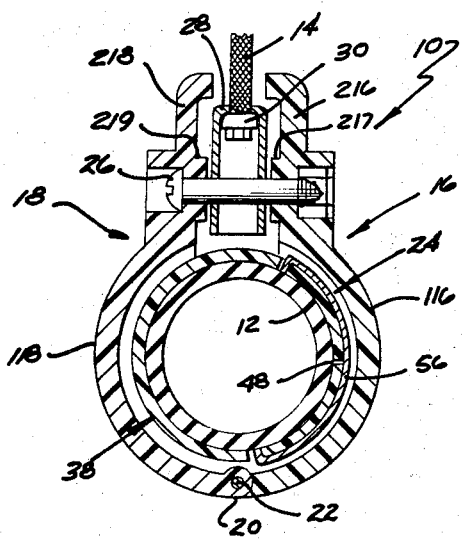
FIG. 2
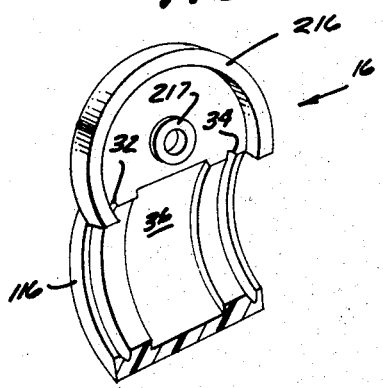
FIG. 3
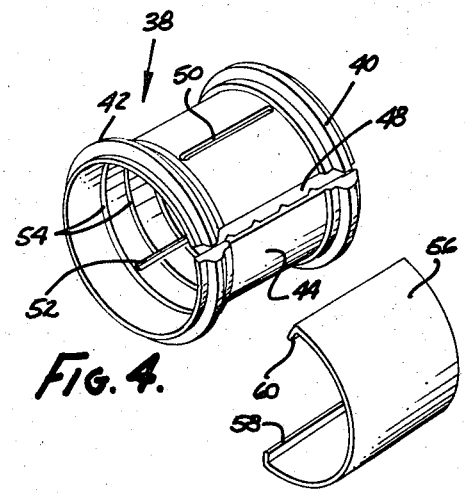
FIG. 4
FIG. 5
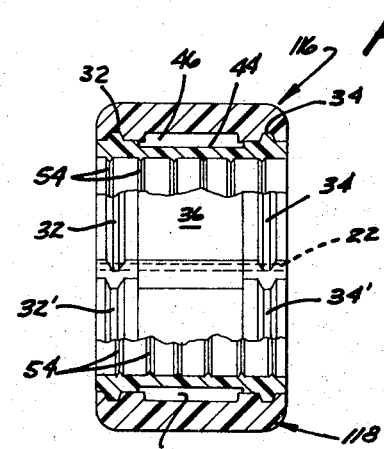
FIG. 6
INVENTOR.
DONOVAN M. DUNKLEE
BY
ATTORNEYS

United States Patent Office 3,419,942
Patented Jan. 7, 1969

1

3,419,942
SWIVELING CLAMP FOR HOSES AND THE LIKE
Donovan M. Dunklee, Prairieville Township, Barry County, Mich., assignor to Walwood Products, Inc., Doster, Mich., a corporation of Michigan
Filed June 30, 1967, Ser. No. 650,404
U.S. Cl. 24—19                    18 Claims
Int. Cl. B65d 63/10

ABSTRACT OF THE DISCLOSURE

A clamping apparatus having an outer portion which is rotatable about an inner portion secured against lengthwise movement to a hose or the like, in which the outer portion is comprised of a pair of jaw bodies with curved jaw portions which substantially encircle the inner member. The latter is comprised of a resiliently flexible cylinder having a slot in its side extending from one end to the other thereof. This slot may be opened sufficiently to slide over the hose by circumferentially spreading the cylinder, after which the latter resiliently returns to its initial condition, in which it then loosely encircles the hose. The cylinder is circumferentially contractable about the hose to grip the latter, and when so contracted the aforesaid slot becomes substantially closed. The cylinder has a slot-like recess in its outer surface on either side of the aforesaid slot, and an arcuate member having a hooking portion on each end is provided to hold the cylinder in its contracted condition by engaging one such hooking end in each of the aforesaid recesses. This arcuate member is preferably flexible and has a smaller radius of curvature than that of the cylinder, such that it must be flexed toward a greater radius of curvature in order to conform to the cylinder and hook its ends in the recesses of the latter. This flexing of the arcuate member creates a spring force which augments the retention of the hooking members and helps maintain the cylinder in its contracted condition about the hose.

BACKGROUND OF THE INVENTION

The present invention relates to a clamp for attachment to an elongate article such as a hose or the like, and more particularly to clamps of this type which have an outer swivel member which is rotatable about an inner member attached to the hose or like object in a secure and immovable manner.

Hoses used on gasoline pumps and the like have in recent years included a cable or cord attached to the hose near its nozzle end and entrained about a return reel mounted in the pump, to facilitate return of the hose to the pump and guard against inadvertent or accidental circumstances in which the nozzle might be dislodged from its rest upon the pump or left lying upon the surface of the drive near the pump. At first, such cables or cords were attached to the hose by very simple clamping means which rigidly secured the cable onto the hose, so that no movement whatever was allowed of the clamped end of the cable with respect to the hose. Such clamps as these permitted no freedom of the cable in use, and consequently they produced a considerable amount of twisting, knotting, and snarling of the cable as a result of the multiple and diverse motions undergone by such hoses in normal usage.

These early clamps were soon improved to include a single degree, and sometimes two degrees, of movement of the cord with respect to the hose; specifically, the cord was pivotally attached to the clamp, and frequently it was also made to be rotatable about its longitudinal axis, as is shown in my previous Patent No. 3,107,110, ob-

2 tained in conjunction with another inventor. Although devices of the type just mentioned were a decided improvement over what had gone before them, it now appears that a more complete solution to the problem involves the need for yet another degree of freedom for the cable or cord, i.e., the clamping means attaching the cord to the hose should be rotatable about the hose, so that the cable does not become wound around the hose; stated differently, the hose should be able to turn within the clamp to keep the cable straight under the tension created by its reeling mechanism.

Some types of swiveling clamps of the nature just referred to have recently been provided by others, and speaking very generally, these have operated satisfactorily. However, the ease of assembly of such a clamp, along with the durability of the installation once assembled, is of paramount importance because the typical user cannot be burdened by and will not tolerate a device requiring special tools or parts, or one which requires more than a bare minimum of effort to properly install. Previous devices incorporated steel snap rings and special binding elements for the purpose of securing an inner member to the hose itself. Such devices as these are widely held in disfavor, since they are difficult and troublesome to assemble and require at least some specialized tools. Also, the economy with which the clamp can be manufactured is a very important factor, and such previous devices are typically more expensive than the basic installation actually requires and, in some cases, more expensive than the trade is willing to meet.

SUMMARY OF THE INVENTION

In contrast to previously-known structures, the present invention provides a freely rotatable or swiveling clamp apparatus which satisfies all of the foregoing criteria with great facility. The device of the invention is basic and relatively uncomplicated in structure, is economical from a manufacturing point of view, is exceedingly reliable in usage, and most importantly, it is extremely easy to assemble anywhere, requiring no special tools and in fact requiring practically no tools whatsoever.

Briefly stated, the swivel clamp apparatus of the invention is comprised of a pair of jaw bodies, each of which define an arcuate jaw portion which, when the bodies are secured together, together form a clamping encirclement for slidably embracing an inner annular bearing member which is secured about a hose in a firm manner and is not subject to lengthwise movement with respect thereto, such that the connected jaw bodies are rotatable about the inner bearing, and thus about the hose, by the aforesaid clamping encirclement. The inner annular bearing comprises a cylindrical member with a slot through its side extending from one end to the other thereof. This bearing is resiliently diametrally flexible so that the slot may be spread sufficiently to pass over the hose, and so that once placed about the hose the cylinder may be resiliently contracted to close, or substantially close, the aforesaid slot and tightly grip the hose. An arcuate bridging member is provided to secure the cylindrical bearing in its contracted condition, by extending across the slot in the cylinder and attaching at its ends to the outer surface of the cylinder on either side of the slot.

BRIEF DESCRIPTION OF THE DRAWINGS

FIG. 1 is a fragmentary side elevation of the clamping apparatus attached to a typical hose;

FIG. 2 is an enlarged fragmentary sectional end elevation taken through the vertical plane II—II of FIG. 1;

FIG. 3 is a fragmentary perspective view of one of the jaw bodies of the clamp;

FIG. 4 is a perspective view of the inner bearing cylinder of the clamp;

FIG. 5 is a perspective view of the bridging member for the cylinder of FIG. 4; and FIG. 6 is an enlarged sectional plan view taken through the horizontal plane VI—VI of FIG. 1.

DESCRIPTION OF A PREFERRED EMBODIMENT

Referring now in more detail to the drawings, the clamp apparatus 10 of the invention is seen generally in FIG. 1 installed upon a typical hose 12 and attaching a cable or cord 14 to the hose in a manner providing three degrees of freedom. The basic construction of the clamp apparatus 10 is seen in FIG. 2, and comprises a pair of jaw bodies 16 and 18, each of which include an arcuate or generally semi-circular jaw portion 116 and 118, respectively, which are pivotally connected together at their bottom extremities by a knuckle hinge 20 having a pivot pin 22. The hinged jaw portions 116 and 118 form a clamping encirclement, i.e., a clamp structure having diametrally-opposed curved jaw segments of similar curvature, for encompassing an annular internal element. In the present case, such an internal element is represented by an annular bearing means 24, which encircles the hose 12. As will subsequently be pointed out, the bearing means 24 grips the hose 12 and is secured thereto against longitudinal movement along the same, whereas the clamping encirclement provided by the two jaw portions is slidably rotatable about the bearing means 24 located therewithin.

The upper extremities of the jaw bodies 16 and 18 are formed to provide a pair of attachment ears 216 and 218, respectively, each of which has an aperture therein through which a bolt 26 passes to interconnect the two jaw bodies at their top. A tubular cable anchor element 28 is pivotally mounted on bolt 26 between the two ears 216 and 218, and each of the latter preferably has a small hub-like internal projection 217 or 219, respectively, for bearing against opposite sides of the anchor element 28 when the same is rotated about bolt 26 to thereby center the anchor element between ears 216 and 218. Also, projections 217 and 219 can be used to provide an index for the tightening of bolt 26 such that the cable 14 will not be pinched between the ears 216 and 218, and also so that the jaw portions 116 and 118 will not be drawn so tightly against the bearing 24 that they cannot be rotated thereabout. Preferably, however, the bolt 26 is threaded only over a predetermined amount at its extremity, to prevent the nut from being turned too far and producing the aforementioned undesired results. The cable 14 passes through a hole in the top of anchor element 28 and is secured therein by a collar means 30 attached to the end of the cable. The basic arrangement of the ears 216 and 218 on the jaw bodies, the anchor element 28, the cord 14, and the collar means 30 is fully illustrated and described in the aforementioned previous Patent No. 3,107,110, to which reference is made for specific details. Consequently, no further discussion of this particular portion of the present clamp apparatus is deemed necessary here.

The two jaw bodies 16 and 18 are substantially identical, and body 16 is shown in detail in FIG. 3 as exemplary of either such body. The inner surface of the arcuate jaw portion 116 of jaw body 16 has a pair of grooves 32 and 34 of V-shaped cross section, each located near a side edge of the jaw portion, and these grooves extend from the upright ear portion 216 around the arcuate inner periphery of the jaw portion, to communicate (or substantially communicate) at the bottom extremity thereof with similar grooves 32′ and 34′, respectively, formed in the opposite jaw portion 118 (FIG. 6), so that the V-shaped grooves continue completely around the inner surface of the clamping encirclement formed by the two jaw portions together. Between grooves 32 and 34 is a flat recessed area 36, which likewise extends circularly about the inner periphery of the jaw portion and communicates with a similar area in the opposite jaw portion.

A first part of the annular bearing means 24 seen in FIG. 2 is seen in more detail in FIG. 4. In essence, this is a cylindrical sleeve-like bearing element 38, which may also be referred to as an annulus. The outer surface of bearing element 38 has a configuration which is complementary to the inner surface of the jaw portions 116 and 118, discussed above. That is, the outer surface of the bearing element has a pair of V-shaped ridges 40 and 42 for mating within the grooves 32 and 34 of the jaw portions. Ridges 40 and 42 are separated by a recessed flat area 44, which aligns with the similar area 36 of the jaw portions to provide a clearance 46 therebetween, shown in FIG. 6.

The circular peripheral excursion of the bearing element 38 is not continuous, but instead this element has a pair of end extremities which define a longitudinal slot 48 extending from one side of the bearing element to the other. The nominal or undistorted form of the bearing element is as shown in FIG. 4, wherein the slot 48 is open and readily discernible. The bearing element also has a pair of elongated recesses 50 and 52 located in the flat area 44 thereof, which extend parallel to the longitudinal axis of this element and which pass through the wall of the element, from its outer surface to its inner surface. Further, the inner surface of the bearing element defines a series of spaced ridges 54, which extend annularly about the inner periphery of the element, perpendicular to the axis thereof. These ridges are for the purpose of engaging and gripping the hose 12, and consequently, while they need not be as large in cross section as the outer ridges 40 and 42, they nonetheless should protrude appreciably beyond the remainder of the flat cylindrical interior of the bearing element.

Bearing element 38 is preferably made from a synthetic plastic substance such as is known by the trademark "nylon" or the like, which has a lubricous surface conductive to sliding contact with other elements; in this case, the clamping encirclement of the two arcuate jaw portions 116 and 118. Also, the bearing element should be resiliently flexible diametrally at least enough to allow the slot 48 to be enlarged sufficiently by diametral expansion of the bearing element to pass the hose 12 through the enlarged slot and thereby place the bearing element about the hose. Such diametral expansion of the bearing element should be completely resilient, however, so that once the bearing is placed about the hose it will resume its initial conditions, wherein the slot 48 is considerably narrower than when the bearing is dilated. Such diametral flexibility also allows the bearing element to be resiliently contracted against the hose, and the nominal width of the slot 48 should preferably be such that when the bearing is resiliently contracted to tightly grip the hose, the slot 48 is substantially closed (FIG. 2).

In order to maintain the bearing element 38 in its contracted condition about the hose 12, a clip-like device referred to as a bridging member 56 (FIGS. 2 and 5) is provided. This is preferably a relatively thin, arcuate, resilient member which may be of spring steel or the like, and which has a width allowing it to fit into the recessed flat area 44 of the bearing element 38. The end extremities of the bridging member 56 are bent or otherwise formed so as to extend inwardly thereof, preferably at an angle of approximately ninety degrees or slightly less than this, to the arcuate surface of this member, to thereby form flange-like hooking means 58 and 60 at each end of this member. These hooking means are arranged to seat within the recesses or slots 50 and 52 in the central portion of bearing element 38 when the latter has been contracted sufficiently to substantially close its slot 48.

The radius of curavture of the bridging member 56 is preferably less than that of the bearing element 38, even when the latter is in its contracted position. Consequently, when the hooking means at the ends of the bridging member are engaged in the recesses 50 and 52 of the bearing element and the latter is circumferentially contracted, the normal radius of curvature of the bridging member will be extended somewhat, thereby resiliently deforming this member so that it exerts a resilient spring force against the bearing element and against the edges of the recessed slots 50 and 52 thereof, which tends to pull the slots toward each other and thereby contract the bearing element. Thus, the resilient spring force of the contracted bearing element and that of the deformed bridging member oppose each other to retain the latter firmly in place across the substantially closed lengthwise slot 48 in the side of the bearing element. As the figures illustrate, the circumferential extent of the bridging member 56 is less than 180 degrees, and this is of course also true of the distance between the recesses 50 and 52 in the bearing element when the same is contracted about the hose, so that the hooking end means 58 and 60 of the bridging member act on the same diametral side of the bearing element.

As will be apparent to those skilled in the art, the present swivel clamp apparatus is readily and quickly installed upon a given hose without the need of any special tools. The bearing element 38 is merely spread sufficiently to slide it over the hose, and the bridging member 56 is secured in place by inserting one of its hooking ends 58 or 60 within the appropriate recess 50 or 52 of the bearing element and then contracting the bearing element about the hose until the other hooking end of the bridging member snaps into place within the other of the aforesaid bearing element recesses. This secures the bearing element to the hose so that it cannot be rotated thereabout or moved lengthwise therealong. The two jaw portions 116 and 118 are then placed about the bearing element and secured together by the bolt 26, in the relationship shown in FIG. 2. Due to the mating of the V-shaped ridges 40 and 42 of the bearing element within the grooves 32 and 34 of the jaw portions, the latter are restrained against longitudinal movement along the hose and held in position about the bearing element. The enagement of these ridges and grooves also provide a pair of smooth annular bearing surfaces which freely slide upon each other so that the two interconnected jaw bodies are freely rotatable about the bearing element, and hence similarly rotatable about the hose.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

I claim:

1. A swivel clamp apparatus for attachment to hoses and the like, comprising in combination: a pair of jaw bodies, each defining an arcuate jaw portion; means for connecting said jaw bodies together with the said jaw portion of each located opposite that of the other to define at least portions of a clamping encirclement; means forming an annular bearing with an internal surface of a diametral size to be fitted about the periphery of a hose or the like and an external surface of a diametral size to be rotatably fitted within said clamping encirclement of said jaw portions; said means forming said annular bearing including at least one arcuately shaped internal bearing element having end extremities defining a slot extending transversely across such element from one side thereof to the other, and a free bridging member attachable to said bearing element to extend across and interconnect the end extremities thereof; said bearing element having a pair of recesses in its external surface and said bridging member having hooking means at each end thereof for insertion into said recesses to attach said bridging member to said bearing element and hold such member in place upon the latter; said bridging member when attached to said bearing element urging the same against said hose to secure such element non-rotatively thereto, thereby holding the clamp apparatus thereupon against lengthwise movement with respect to the hose; and said rotatable fit between said annular bearing means and said clamping encirclement provided by said jaw portions allowing said jaw bodies to swivel around said hose.

2. The lamp apparatus recited in claim 1, wherein said bearing element is at least slightly diametrally contractible, and wherein said element is so contracted by attachment thereto of said bridging member; said diametral contraction of said bearing element causing the same to grip said hose, thereby non-rotatively securing the bearing element thereto.

3. The clamp apparatus recited in claim 1, wherein said bridging member is at least slightly resiliently flexible and is of a size and shape requiring it to be flexed to attach it to said bearing element; said member upon being so flexed exerting a resilient spring force upon said bearing element to agument the attachment of the bridging member thereto and urge the bearing element against said hose.

4. The lamp apparatus recited in claim 3, wherein said bridging member is arcuately formed and of a radius of curvature less than that of said bearing element; said resilient flexure of said member being an enlargement of said radius.

5. The clamp apparatus recited in claim 4, wherein said bearing element is at least slightly diametrally contractible and wherein said element is so contracted by attachment thereto of said bridging member; said diametral contraction of said bearing element causing the same to grip said hose, thereby non-rotatively securing the bearing element thereto.

6. The clamp apparatus recited in claim 1, wherein said arcuately shaped internal bearing element comprises a single annulus with a continuous circumferential extent between said end extremities of at least one hundred eighty degrees.

7. The clamp apparatus recited in claim 6, wherein said annulus is resiliently flexible diametrally an extent sufficient to spread said end extremities enough to allow said hose to be passed through said slot, to thereby place the annulus about the hose.

8. The clamp apparatus recited in claim 6, wherein said annulus is laterally elongated and generally cylindrical in form.

9. The clamp apparatus recited in claim 6, wherein said recesses in the external surface of said bearing element annulus are spaced apart by an arc extending across the end extremities of said annulus and having a maximum extent of one hundred eight degrees.

10. The clamp apparatus recited in claim 9, wherein said annulus is laterally elongated and generally cylindrical in form, wherein said recesses are laterally elongated and generally parallel to the longitudinal axis of said annulus, and wherein said hooking means at each end of said bridging member are elongated flanges for fitting into said elongated recesses.

11. The clamp apparatus recited in claim 6, wherein said bearing element is at least slightly diametrally contractible, and wherein said element is so contracted by attachment thereto of said bridging member; said diametral contraction of said bearing element causing the same to grip said hose, thereby non-rotatively securing the bearing element thereto.

12. The clamp apparatus recited in claim 11, wherein said circumferential extent of said bearing element is such that said slot between said end extremities is substantially closed by said diametral contraction.

13. The clamp apparatus recited in claim 11, wherein said bridging member is at least slightly resiliently flexible and is of a size and shape requiring it to be flexed to attach it to said bearing element; said member upon being so flexed exerting a resilient spring force upon said bearing element to augment the attachment of the bridging member thereto and urge the bearing element against said hose.

14. The clamp apparatus recited in claim 13, wherein said bridging member is arcuately formed and of a radius of curvature less than that of said bearing element; said resilient flexure of said member being an enlargement of said radius.

15. The lamp apparatus recited in claim 14, wherein said circumferential extent of said bearing element is such that said slot between said end extremities is substantially closed by said diametral contraction.

16. The clamp apparatus recited in claim 15, wherein said annulus is resiliently flexible diametrally an extent sufficient to spread said end extremities enough to allow said hose to be passed through said slot, to thereby place the annulus about the hose.

17. The clamp apparatus recited in claim 6, wherein said bridging member is at least slightly resiliently flexible and is of a size and shape requiring it to be flexed to attach it to said bearing element; said member upon being so flexed exerting a resilient spring force upon said bearing element to augment the attachment of the bridging member thereto and urge the bearing element against said hose.

18. The clamp apparatus recited in claim 17, wherein said bridging member is arcuately formed and of a radius of curvature less than that of said bearing element; said resilient flexure of said member being an enlargement of said radius.

References Cited
UNITED STATES PATENTS

| 1,649,752 | 11/1927 | Stone | 285—420 X |
| 3,107,110 | 10/1963 | Dunklee et al. | 287—92 |
| 3,329,455 | 7/1967 | Becker et al. | 287—92 |

FOREIGN PATENTS 1,077,461  4/1954  France.

DONALD A. GRIFFIN, *Primary Examiner.*

U.S. Cl. X.R.

287—92